US012760828B2

(12) United States Patent
Boucher et al.

(10) Patent No.: US 12,760,828 B2
(45) Date of Patent: Oct. 13, 2026

(54) FLUIDLY CONNECTING END CAP

(71) Applicant: 11814192 Canada Inc., Sherbrooke (CA)

(72) Inventors: Benoit Boucher, Sherbrooke (CA); Jonathan Thifault, Ste-Agathe-des-Monts (CA); Sandra Blondeau, Sherbrooke (CA); Carl Boissonneault, Sherbrooke (CA)

(73) Assignee: 11814192 Canada Inc., Sherbrooke (CA)

( * ) Notice: Subject to any disclaimer, the term of this patent is extended or adjusted under 35 U.S.C. 154(b) by 620 days.

(21) Appl. No.: 17/595,120

(22) PCT Filed: May 11, 2020

(86) PCT No.: PCT/CA2020/050638

§ 371 (c)(1),
(2) Date: Nov. 9, 2021

(87) PCT Pub. No.: WO2020/223827

PCT Pub. Date: Nov. 12, 2020

(65) Prior Publication Data

US 2022/0213995 A1 Jul. 7, 2022

Related U.S. Application Data

(60) Provisional application No. 62/845,734, filed on May 9, 2019.

(51) Int. Cl.
*F16L 41/03* (2006.01)
*F16L 41/00* (2006.01)
*G01L 19/00* (2006.01)

(52) U.S. Cl.
CPC ............ *F16L 41/03* (2013.01); *F16L 41/008* (2013.01); *G01L 19/0007* (2013.01)

(58) Field of Classification Search
CPC ....... F16L 41/03; F16L 41/008; F16L 55/115; G01L 19/0007
USPC .......................................................... 285/901
See application file for complete search history.

(56) References Cited

U.S. PATENT DOCUMENTS 4,346,921 A * 8/1982 Gill ........................ E02D 29/12 285/125.1
4,357,992 A * 11/1982 Sweeney ............ E21B 33/1243 166/387
4,508,371 A * 4/1985 Maier .................... F16L 45/00 220/788
4,723,705 A * 2/1988 Persson .................. F16K 24/04 237/66
4,909,280 A * 3/1990 Friedrich ................ F16L 55/10 73/49.1

(Continued)

*Primary Examiner* — James M Hewitt, II

(74) *Attorney, Agent, or Firm* — Brouillette Legal inc.; Philippe Brouillette

(57) ABSTRACT

A single-piece conduit end cap configured to fluidly connect multiple conduits. The conduit end cap may comprise multiple apertures defined by the arms of a fitting interconnecting the apertures. The fitting may additionally comprise an opening allowing a fluid communication between the apertures and the interior of the end cap. To that end, the single-piece conduit end cap may allow the installation of various pipes without the need for additional fittings or components.

18 Claims, 7 Drawing Sheets

(56) References Cited

U.S. PATENT DOCUMENTS

| | | | | |
|---|---|---|---|---|
| 5,417,122 | A * | 5/1995 | Casey | E21B 25/02<br>73/864.45 |
| 7,311,011 | B2 * | 12/2007 | Clark | E21B 47/002<br>73/864.74 |
| 10,508,047 | B2 * | 12/2019 | Pelletier | C02F 1/325 |
| 2005/0166985 | A1 * | 8/2005 | Brown | F16L 55/115<br>138/96 R |
| 2015/0198475 | A1 * | 7/2015 | Vander Horst | G01F 23/165<br>73/302 |
| 2018/0283592 | A1 * | 10/2018 | Chappell | F16L 3/003 |
| 2019/0011937 | A1 * | 1/2019 | Gearheart | G05D 7/0652 |

* cited by examiner

FLUIDLY CONNECTING END CAP

CROSS-REFERENCE TO RELATED APPLICATIONS

The present patent application claims the priority of U.S. Patent Application No. 62/845,734, entitled "PIEZOVENT" and filed with the United States Patent and Trademark Office on May 9, 2019, the contents of which are incorporated herein by reference.

FIELD OF THE INVENTION

The present invention generally relates to effluent pipelines such as wastewater pipelines and wastewater treatment systems in rows. More particularly, the present invention concerns a single-piece piping end cap allowing fluid communication with other pipes and conduits.

BACKGROUND OF THE INVENTION

In the field of wastewater treatment, end caps are typically used to limit the flow of effluent beyond a distal end of a conduit while still allowing fluid communication with other pipes and conduits such as piping for connecting a piezometer or an aeration vent.

Various conduit end caps have been proposed for allowing fluid connection to other forms of piping. For example, U.S. Pat. No. 6,792,977 discloses an end cap comprising two off-axis openings configured to be fitted with separate adapters or fittings allowing for the connection of additional piping.

The use of the aforementioned end cap presents certain drawbacks, namely the requirement of additional installation parts and processes. These increase installation time and costs while introducing additional failure points within the system. There is therefore a need for an end cap comprising the necessary fittings allowing for a secure and cost-effective attachment of additional piping.

SUMMARY OF THE INVENTION

The present invention is directed to an end cap for a conduit comprising an open portion configured to mate with the conduit, an enclosure in fluid communication with the skirt portion, the enclosure comprising at least two apertures, and an inner conduit comprising at least two ends, each of the at least two ends being adapted to be received by the at least two apertures, and the inner conduit being in fluid communication with the enclosure.

The inner conduit may further comprise an opening, the bottom opening being in fluid communication with the enclosure. One of the at least two apertures may be configured to receive a piezometer while the other aperture may be configured to receive a vent conduit. The first aperture may be adapted to receive a piezometer while the second aperture may be adapted to receive a vent conduit. Each of the ends of the inner conduit may be inserted in each of the first and second apertures of the enclosure. To that end, the inner conduit may be L-shaped.

The enclosure may comprise three apertures, a first aperture being adapted to receive a piezometer, and second and third apertures being each adapted to receive a vent conduit. The inner conduit may comprise three arms, each of the arms being inserted in each of the first, second and third apertures. The inner conduit may be T-shaped. The open portion may be a skirt portion configured to mate with the conduit and the enclosure and the inner conduit may be unitary.

In another aspect of the invention, the end cap for a conduit may comprise an open portion configured to mate with the conduit, an enclosure in fluid communication with the open portion, the enclosure comprising two side walls and a top portion, a first of the side walls comprising a first aperture, a second of the side walls comprising a second aperture and the top portion comprising a third aperture. The end cap may further comprise an inner conduit comprising three arms, each of the three arms being received by each of the three apertures, the inner conduit being in fluid communication with the enclosure, the first and second arms being configured to each receive a vent conduit, the third arm being adapted to receive a piezometer.

The inner conduit may be T-shaped, the inner conduit may further comprise an opening, the opening being in fluid communication with the enclosure, and the open portion may be a skirt portion configured to mate with the conduit.

In yet another aspect of the invention, a method of venting multiple drainage conduits within a wastewater treatment system is provided. The method comprises fluidly connecting an end cap to each of the drainage conduits, the end cap comprising an inner conduit in fluid communication with the end cap and fluidly connecting a venting conduit to each arm of the inner conduit of each end cap to form a continuous venting conduit.

The method may further comprise fluidly connecting each of the vent conduits to side arms of each of the inner conduits, fluidly connecting a piezometer to an unconnected arm of each of the inner conduits, fluidly connecting each of the piezometers to a top arm of each of the inner conduits. The inner conduit may be in fluid communication with an enclosure of the end cap.

BRIEF DESCRIPTION OF THE DRAWINGS

The above and other objects, features and advantages of the invention will become more readily apparent from the following description, reference being made to the accompanying drawings in which.

DETAILED DESCRIPTION OF THE PREFERRED EMBODIMENT

A novel fluidly connecting end cap will be described hereinafter. Although the invention is described in terms of specific illustrative embodiments, it is to be understood that the embodiments described herein are by way of example only and that the scope of the invention is not intended to be limited thereby. More specifically, the present invention will be described in relation to a wastewater treatment system. It is to be understood however that the present invention may be used in relation to a number of other systems utilizing fluids.

Figure 1:
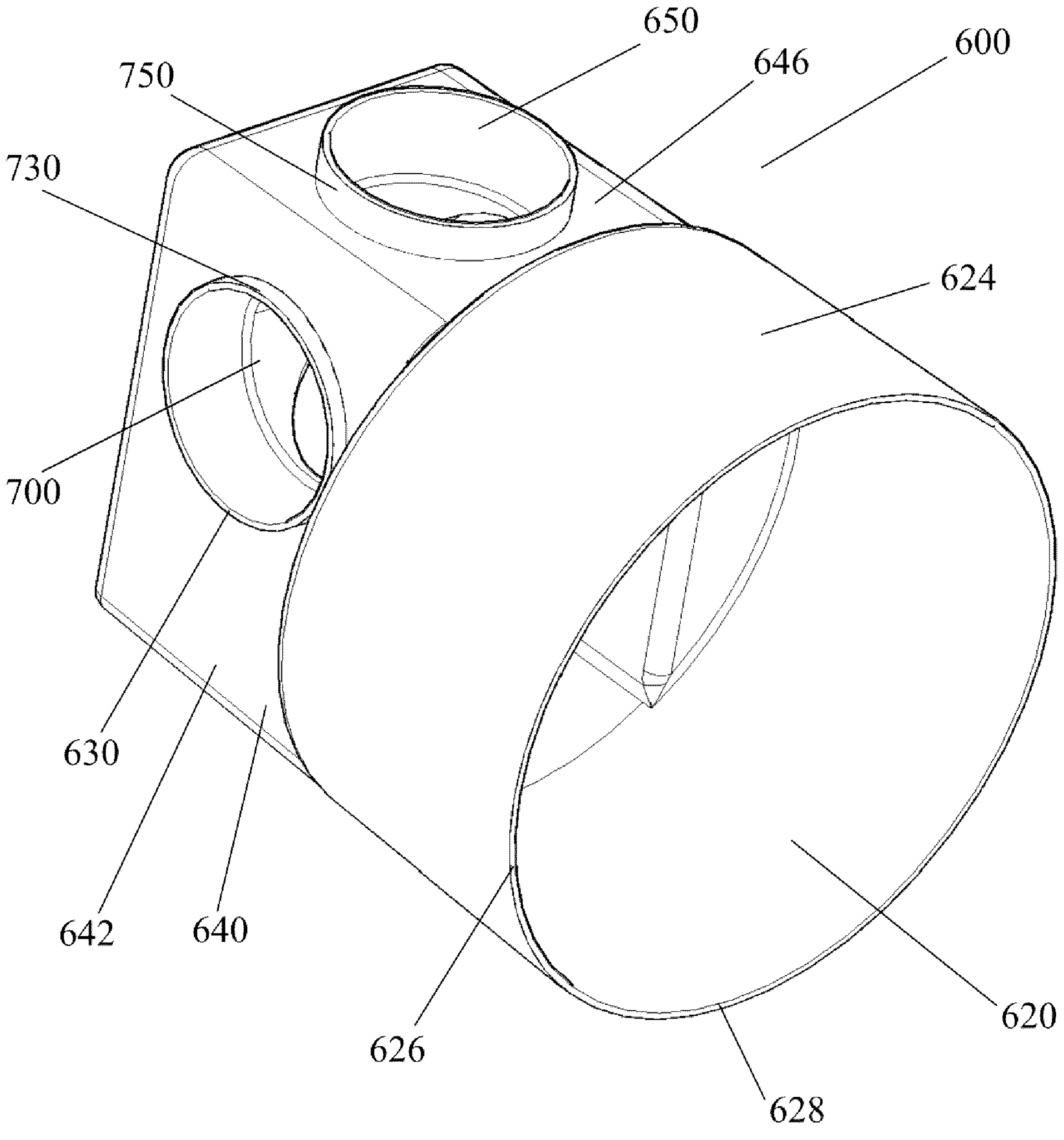
FIG. 1 is an isometric perspective view of an exemplary end cap in accordance with the principles of the present invention.
Figure 2:
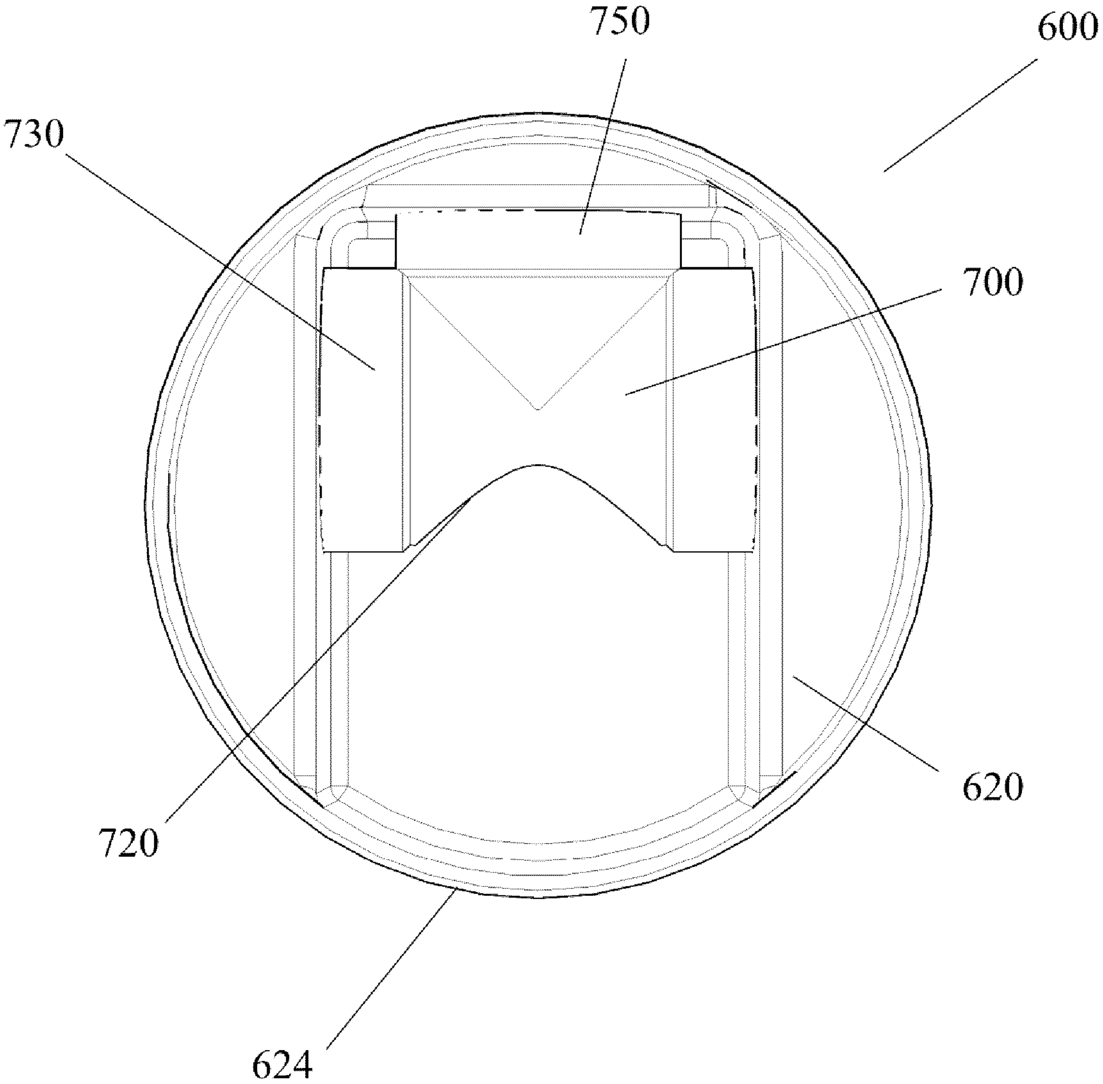
FIG. 2 is a front elevation view of the end cap of FIG. 1.
Figure 3:
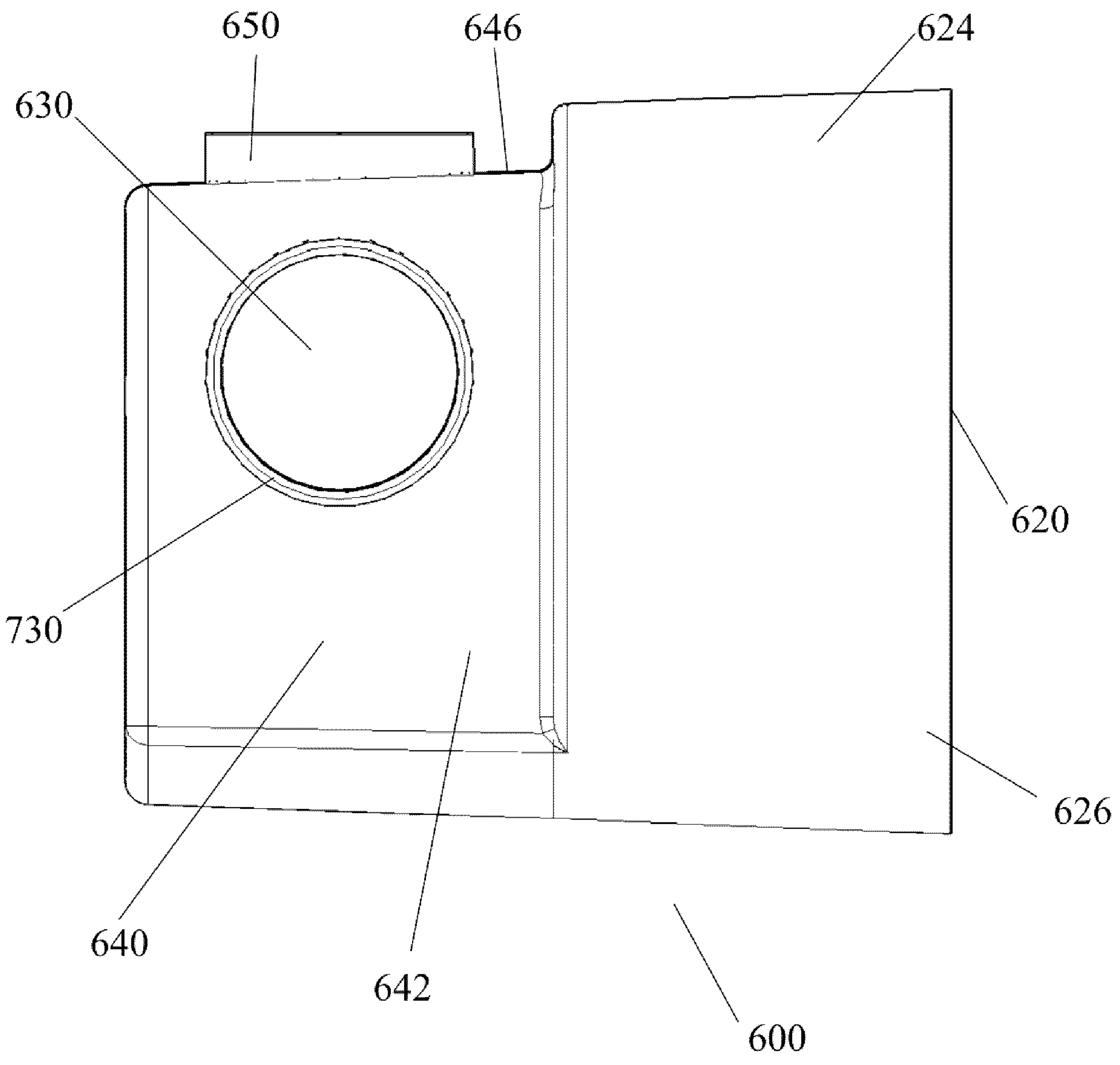
FIG. 3 shows a side elevation view of the end cap of FIG. 1.
Figure 4:
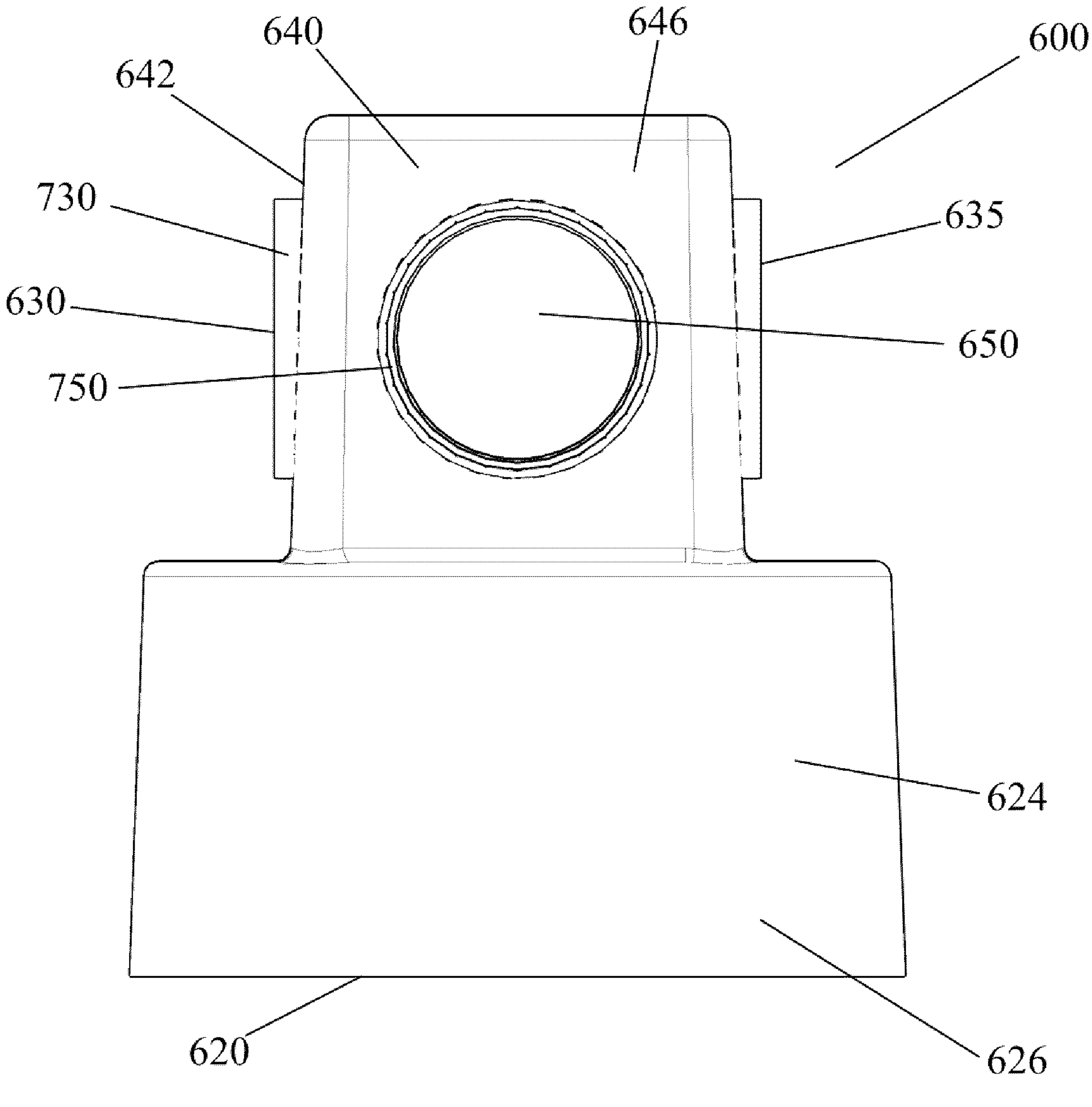
FIG. 4 is a top plan view of the end cap of FIG. 1.

Referring now to FIG. 1, an embodiment of an end cap 600 for fluidly connecting various piping elements is illustrated. The end cap 600 typically comprises an aperture 620 (also referred to as the conduit aperture 620) adapted to be connected to a drainage conduit 240 for a wastewater treatment system. The wastewater treatment system may be embodied similarly to the system described in International Patent Application No. PCT/CA2020/050597 entitled "LOW-PRESSURE DISTRIBUTION SYSTEM AND METHOD". Understandably, the end cap 600 may be used with any other wastewater treatment system, drainage system or piping system.

Figure 5:
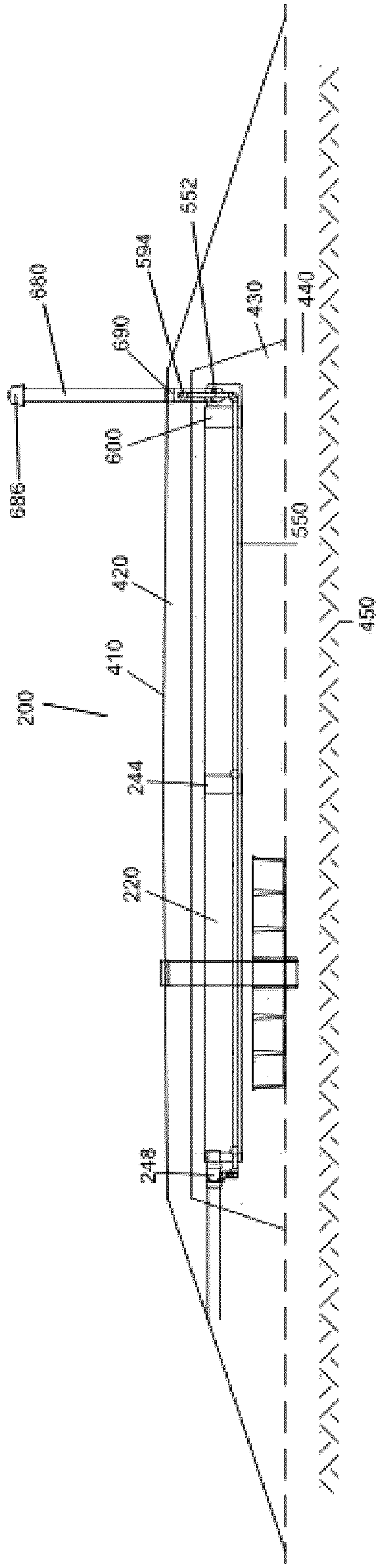
FIG. 5 is a side elevation view of an exemplary drainage field using an end cap in accordance with the principles of the present invention.
Figure 6:
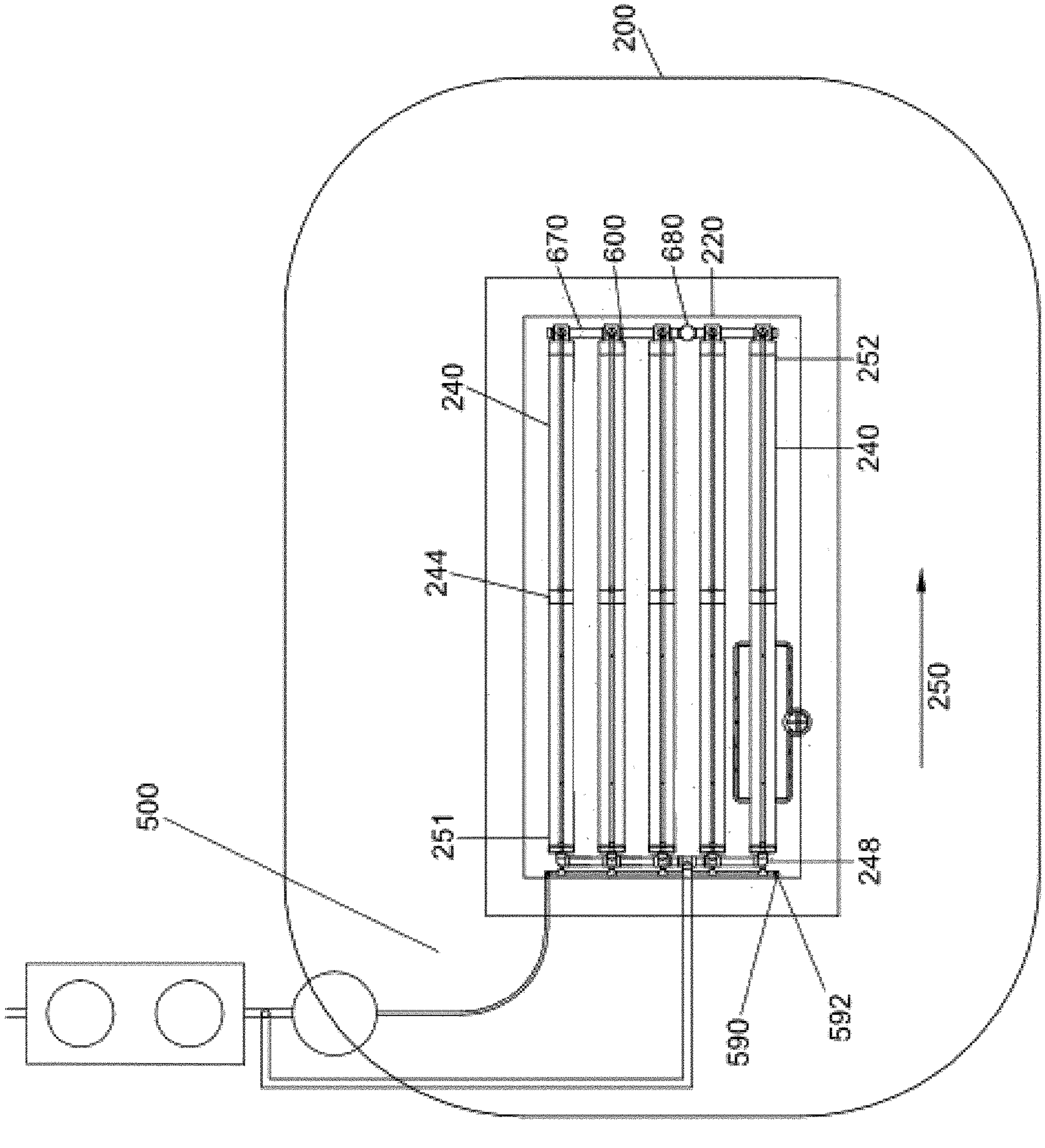
FIG. 6 is a plan view of the drainage field of FIG. 5.
Figure 7:
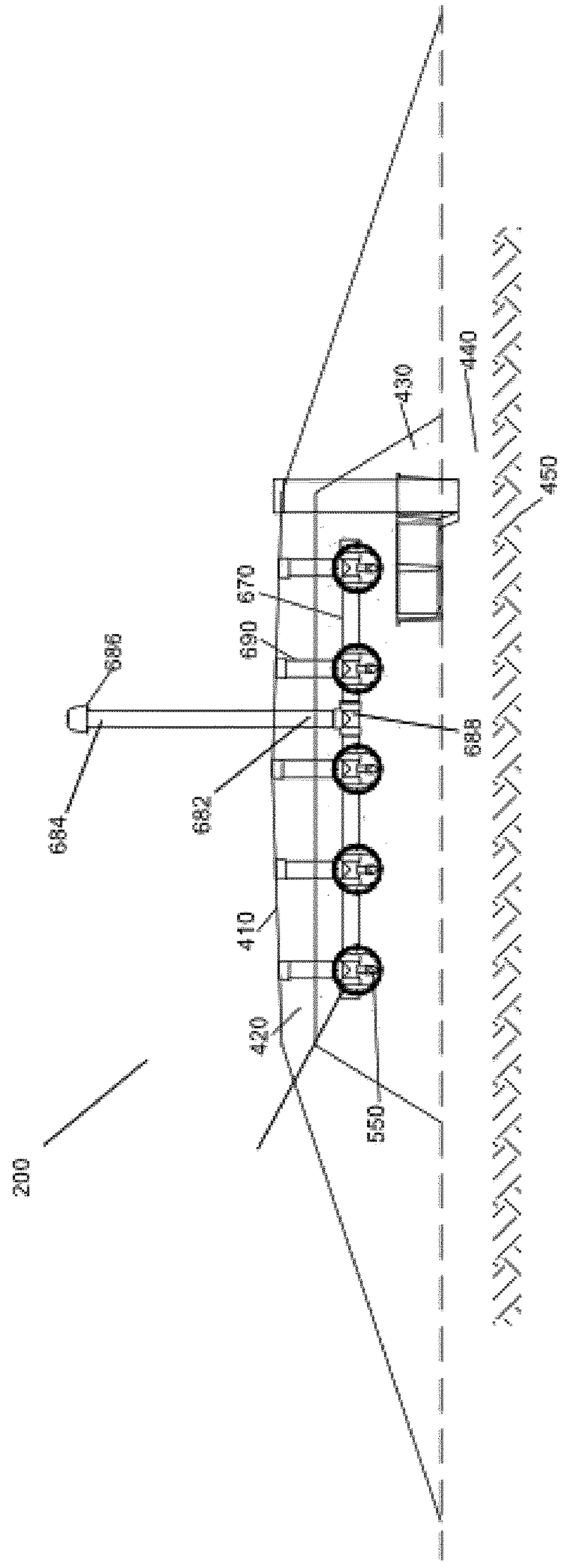
FIG. 7 is a front elevation view of the drainage field of FIG. 5.

Referring now to FIGS. 5 to 7, the wastewater treatment system typically comprises an input source, such as a drainage pipe (not shown), a septic tank (not shown) and a drainage field 200. In some embodiments, the drainage field 200 is configured to receive and treat an effluent from the septic tank into treated wastewater.

Now referring to FIG. 5, the drainage field 200 may comprise a leach system 220 disposed between a plurality of ground layers. In such embodiments, the drainage field 200 comprises a surface 410, a covering layer 420 immediately below the surface 410, a filtering medium 430, a permeable soil 440 and a bedrock 450. In some embodiments, one or more of the layers may overlap and combine thereby removing any clear delineation between them.

Now referring to FIG. 6, in some embodiments, the end caps 600 may be connected to multiple drainage passages or conduits 240 configured to fluidly receive and treat the effluent. The drainage conduits 240 may comprise pipes configured to carry and distribute the effluent across the drainage field 200. In some embodiments, the pipes may be perforated pipes. The effluent flowing in the drainage conduits 240 may be conveyed by gravitational forces in tandem with the geometry of the drainage conduits 240 towards the end caps 600. The end cap 600 is fluidly connected to the drainage conduits 240. In some embodiments, the end cap 600 is detachably affixed to the drainage conduits 240. The end cap 600 may be adapted to partially or entirely limit the flow of the effluent 130 outside of the downstream ends 252 of the drainage conduits 240.

The drainage conduits 240 may have any cross-sectional shape adapted to accommodate the volume of water to be disposed supplied by the wastewater treatment system and/or to accommodate the topographic requirements of the installation site. For example, in the present embodiment, the drainage conduits 240 are circular. It may be appreciated that the drainage conduits 240 may have any other cross-sectional shape known in the art. In some embodiments, the drainage conduits 240 may have a cross-sectional area of 175 $cm^2$ to 2,000 $cm^2$.

The drainage conduits 240 may be made of any semi rigid material. Examples of possible construction materials include, but are not limited to, plastics such as polypropylene and polyethylene or flexible metal. Other polymers, fibrous material, metal, rubber or rubber-like materials may also be used.

In some further embodiments, the drainage conduits 240 may be configured in parallel, in series or of combination thereof, such as with some drainage conduits 240 being positioned in parallel and other drainage conduits 240 being positioned in series. When configured in series, the drainage conduits 240 may be interconnected by means of couplers 244 configured to allow a fluid communication between two or more drainage conduits 240. When configured in parallel, the drainage conduits 240 may be interconnected at their upstream ends 251 by means of a distribution device 248 configured to distribute the effluent across the two or more interconnected drainage conduits 240.

Still referring to FIG. 6, the flow of the effluent within the drainage conduits 240 further defines a stream direction 250 wherein the beginnings of the drainage conduits 240 in the direction of the stream direction 250 are defined by the upstream ends 251 and the ends of the drainage conduits 240 in the direction of the stream direction 250 are defined as downstream ends 252.

The effluent released from the leach system 220 may be absorbed by the filtering medium 430 enveloping the leach system 220. In some embodiments, the filtering medium 430 may be adapted to neutralize pollutants disposed within the effluent percolating throughout the filtering medium 430, thereby providing a third treatment of the wastewater. These pollutants may include, but are not limited to, pathogens, nitrogen, phosphorous or any other contaminants. The filtering medium 430 may further comprise sand, organic matter (i.e. peat, sawdust) or any other suitable medium or combination known in the art capable of removing or neutralizing pollutants.

In the exemplary embodiment illustrated in FIGS. 1 to 4, the end cap 600 comprises an enclosure 640 in fluid communication with the conduit aperture 620. The enclosure 640 comprises at least two apertures, a first aperture 630 adapted to receive a vent conduit and a second aperture 650 adapted to receive a piezometer conduit. The first aperture 630 is typically located on side walls 642 of the enclosure and the second aperture 650 is typically located on a top portion 644 of the enclosure 640. In some embodiments, the end cap 600 may further comprise an inner conduit 700 comprising two ends, a first end 730 adapted to be received by the first aperture 630 and a second end 750 adapted to be received by the second aperture 650. The inner conduit 700 further comprises a bottom opening 720 adapted to be in fluid communication with the end cap 600, typically in fluid communication with the enclosure 640. In such embodiments, the inner conduit 700 may be shaped as an L-shaped connector.

In further embodiments, the enclosure 640 comprises a third aperture 635, generally located on the side wall 642 opposed to the first aperture 630. In such embodiments, the inner conduit 700 may be shaped as a T-shaped connector, each extremity of the inner conduit 700 being received by the first, second and third apertures 630, 635, 650 of the enclosure 640. The extremities received by the first and third apertures 630, 635 are adapted to be each connected to a vent conduit 670, each vent conduit 670 going in opposite directions and connecting to other end caps 600.

In some embodiments, the end cap 600 comprises a cross-sectional area adapted to receive the drainage conduit 240. In further embodiments, the conduit aperture 620 is adapted to sealingly receive the drainage conduit 240. The end cap 600 is typically fluidly connected to the drainage conduit 240 near the downstream end 252 and affixed thereto.

In the exemplary embodiment illustrated in FIGS. 1 to 4, the end cap 600 comprises a skirt portion or female portion 624 having an end 626 proximal to the drainage conduit 240. Understandably, in some embodiments, the female portion 624 may be replaced with a male portion adapted to fit in the cross-section of the drainage conduit 240. As such, in typical embodiments, the cross-sectional area 628 of the conduit aperture 620 may be slightly larger than the cross-sectional area 246 of the drainage conduit 240. The difference of size of the cross-sectional areas 246, 628 generally aims at allowing the drainage conduits 240 to be inserted within the end cap 600. In other embodiments, the cross-sectional area 628 of the conduit aperture 620 may be slightly smaller than the cross-sectional area 246 of the drainage conduit 240. The difference of size of the cross-sectional areas 246, 628 generally aims at allowing the drainage conduits 240 to slide over the end cap 600. In a preferred embodiment, the cross-sectional geometry and area of the conduit aperture 620 may be similar such as to allow an interference fit or press fit between the end cap 600 and drainage conduit 240. In other embodiments, the end cap 600 may be affixed to the drainage conduit 240 using fasteners, threading or any other know method affixing two pieces of piping.

In certain embodiments, the drainage conduit 240 and the end cap 600 may be sealingly affixed to one another thereby preventing undesired leaks or release of the effluent 130 at the junction between the drainage conduit 240 and the end cap 600. The fluid seal between the drainage conduit 240 and end cap 600 may occur as a consequence of the interference fit or may be obtained by applying a radial force on the drainage conduit 240 and end cap 600 thereby forcing them together. The radial force may be exerted by a cylindrical fastener, cable tie or any other known means of radially compressing objects.

The end cap 600 may further comprise an enclosure 640 at the distal end of the end cap 600 and configured to either partially or entirely limit the flow of the effluent 130. In certain embodiments, the female portion 624 and enclosure 640 may be unitary. To that end, the female portion 624 and the enclosure 640 may form a single piece. In yet other embodiments, the female portion 624 and enclosure 640 may define a continuous surface.

In some embodiments, the end caps 600 are made of any semi rigid material. Examples of possible construction materials include, but are not limited to, plastics such as polypropylene and polyethylene or flexible metal. Other polymers, fibrous material, metal, rubber or rubber-like materials may also be used. Understandably, the end cap 600 may be manufactured using any known manufacturing process known in the art, such as but not limited to machining, extrusion, 3D printed or any other known method of manufacturing pipe fittings.

The leach system 220 may additionally comprise one or more vents 680 configured to allow the circulation of air within the drainage conduits 240. The vents 680 may comprise a substantially vertical shaft extending from a lower end 682 in fluid communication with the drainage conduits 240 to an upper end 684 disposed above the surface 410 allowing access to the outside air or atmosphere. The upper end 684 may comprise a vent cap 686 configured to prevent any substance, such as rainwater, debris or any other contaminant, from entering the vent 680.

The end cap 600 is adapted to be fluidly connected to one or more vent conduits 670, typically through the enclosure 640. The vent conduits 670 are thus interconnecting each of the one or more drainage conduits 240. In the event of multiple drainage conduits 240 it may additionally be desirable to fluidly interconnect the drainage conduits 240 to a single vent 680 thereby potentially reducing installation time and costs.

In the example embodiment illustrated in FIGS. 6 and 7, adjacent end caps 600 are fluidly interconnected along with vent 680 by means of several vent conduits 670. The inner vent conduits 670 may comprise any shape and length necessary to interconnect adjacent end caps 600. The vent conduits 670 may additionally be made of any semi rigid or rigid material. Examples of possible construction materials include, but are not limited to, plastics such as polypropylene and polyethylene or flexible metal. Other polymers, fibrous material, metal, rubber or rubber-like materials may also be used. The vent conduits 670 may be shaped as any cross-sectional geometry and area necessary to ensure an unobstructed aeration of the drainage conduits 240.

Referring to FIG. 7, the leach system 220 may comprise a vent junction 688 configured to allow a fluid communication between the lower end 682 of the vent 680 and one or more vent conduits 670.

Referring back to FIGS. 1 to 4, the vent conduits 670 may be fluidly connected to the end caps 600 by means of the first and third apertures 630, 635. In this example embodiment, the first and third apertures 630, 635 are disposed in the side walls 642 of the end cap 600. In other embodiments however, the first and third apertures 630, 635 may be disposed in any other surface of the enclosure 640 or of the end cap 600. The first and third apertures 630, 635 may have any cross-sectional geometry and area necessary to receive the vent conduits 670.

The leach system 220 may further comprise one or more piezometers 690 configured to measure and indicate the volume of the effluent 130 disposed within the drainage conduits 240. It may be appreciated that a high volume of the effluent 130 within the drainage conduits 240 may represent a malfunctioning of the wastewater treatment system. In such embodiments, the leach system 220 comprises a piezometer 690 connected to the end cap 600 with a gauge located above the surface 410. The location of the piezometer 690 generally aims at easing inspection by a user, such as a trained individual.

To that end, the end caps 600 may comprise a piezometer aperture 650 configured to allow fluid access to a piezometer 690. In this example embodiment, the piezometer aperture 650 is disposed on the enclosure 640 of the end cap 600. In other embodiments however, the piezometer aperture 650 may be disposed on the female portion 624 or any other location on the end caps 600. The piezometer aperture 650 may have any cross-sectional geometry and area necessary to receive the piezometer 690. In other embodiments still, the piezometer aperture 650 may be disposed on a distal surface 642 of the end cap 600.

In certain embodiments, the inner conduit 700 may be configured to interconnect or pass through one or more of the apertures 630, 635, 640 of the end caps 600. The inner conduit 700 may comprise any shape suitable for interconnecting or passing through the apertures of the end caps 600. In the example embodiment illustrated in FIGS. 1 to 4, the inner conduit 700 comprises a T-shape. To that end, the inner conduit 700 comprises junction arms or pipes 730 and piezometer arm or pipe 750. In such embodiment, the radially distal ends of the junction arms 730 and piezometer arm 750 define the junction apertures 630 and piezometer aperture 650, respectively.

The inner conduit 700 typically comprises an opening 720 configured to allow fluid access between the interior volume of the end caps 600 and the interior of the inner conduit 700. In a preferred embodiment, the opening 720 is positioned at an elevation above the free surface of the resting effluent 130 within the drainage conduits 240 during regular operation thereby preventing the effluent 130 from entering the junction pipes 670 and piezometer 690.

In some embodiments, the female portion 624, the enclosure 640, the inner conduit 700 or any combination thereof may be unitary. To that end, the female portion 624, the enclosure 640, the inner conduit 700 or any combination thereof may form a single piece.

It may be appreciated that the topographical arrangement or soil composition of a particular drainage field 200 may not be suitable for the proper functioning of a wastewater treatment system. In particular and as illustrated in FIG. 5, certain drainage fields 200 may comprise denivelations which require the installation of a leach system 220 comprising drainage conduits 240 located at varying heights. Such exemplary arrangement may prevent the effective conveyance of the effluent across the leach system 220 due solely to gravitational forces. Similarly, certain drainage fields 200 may comprise a filtering medium 430 or permeable soil 440 incapable of absorbing a continuous supply of the effluent or treated wastewater. It may therefore be beneficial to allow dosing of the effluent 130 into the leach system 220.

In some embodiments, the wastewater treatment system comprises a low-pressure distribution system 500 capable of providing a pressurized flow of the effluent across the leach system 220. The low-pressure distribution 500 system may be embodied similarly to the system described in International Patent Application No. PCT/CA2020/050597 entitled "LOW-PRESSURE DISTRIBUTION SYSTEM AND METHOD". The low-pressure distribution system 500 typically comprises a pumping system (not shown). The pumping system may be in fluid communication with the septic tank and with the leach system 220. Understandably, the pumping system may be installed at any other suitable location known in the art.

Now referring to FIGS. 5 to 7, the low-pressure distribution system 500 may further comprise one or more pressure conduits 550 configured to distribute the effluent along the drainage conduits 240. The pressure conduits 550 may be configured to be installed within the drainage conduits 240. The pressure conduits 550 may have any cross-sectional shape adapted to fit within the drainage conduits 240 and a cross-sectional area smaller than that of the drainage conduits 240. For example, in the present embodiment, the pressure conduits 550 are circular with a diameter which is less than that of the drainage conduits 240. It may be appreciated that the pressure conduits 550 may have any other cross-sectional shape known in the art. In certain embodiments, the pressure conduits 550 comprise a cross-sectional geometry suitable to ensure a pressurized flow of the effluent 130 along a substantial length or an entirety of the drainage conduits 240. In a preferred embodiment, the pressure conduits 550 may have a cross-sectional area of 6 $cm^2$ to 60 $cm^2$.

In certain embodiments, the pressure conduits 550 may be disposed along the bottom of the drainage conduits 240 and resting on the inner surfaces of the drainage conduits 240. In other embodiments, the pressure conduits 550 may be suspended or supported by support structures (not shown) such that they are partially or entirely disjoined from the drainage conduits 240. In yet other embodiments, the pressure conduits 550 may be affixed at any position along the inner circumference of the drainage pipes 240 using cables, straps, tie wraps or any other known means of attaching a pipe to a surface.

In the example embodiment illustrated in FIG. 6, the low-pressure distribution system 500 may further comprise a pressurized cleansing system 590 configured to allow a cleansing of the low-pressure distribution system 500. To that end, the pressurized cleansing system 590 may allow a user to introduce pressurized fluid into the low-pressure distribution system 500 in the event that a pressure conduit 550 becomes clogged or as part of general maintenance. In certain embodiments, the pressurized cleansing system 590 may comprise an inlet 592 allowing pressurized fluid to be introduced into the low-pressure distribution system 500. The inlet 592 may comprise a valve for attaching a pressurized hose or any other pressurized fluid attachment system known in the art. The pressurized cleansing system 590 may further comprise a release valve 594 configured to release pressurized fluid from the low-pressure distribution system such as to avoid a flooding of the drainage field 200. In certain embodiments, the release valve 594 may be located above the surface 410 and in fluid communication with a fluid collection device (not shown) configured to collect the pressurized fluid. The release valve 594 may be manually operated or automatically opened upon detection of a predetermined pressure level within the low-pressure distribution system 500.

The end caps 600 may further be configured to receive a pressure conduit 550. Configured in this manner, the low-pressure distribution system 500 may further comprise a vertical conduit 552 extending substantially vertically through the opening 720 and into the fitting 700. In the example embodiment illustrated in FIG. 7, the release valve 594 is disposed along the vertical conduit 552 thereby allowing a release of pressurized fluid within the piezometer 690.

In certain embodiments, it may be undesirable to connect an additional piping to the junction apertures 630 and piezometer aperture 650. In such an embodiment, the one or more unused apertures may be partially or entirely covered by an aperture cap (not shown) thereby limiting access to said apertures. In other embodiments, the one or more unused apertures may be partially or entirely filled by an aperture filling (not shown).

Although the invention is described in relation to a wastewater treatment system, it is to be understood that the end cap 600 may be employed in various other applications requiring the connection of various pipes and fittings including water, gas and bulk solid distribution, irrigation, compressed air systems, manufacturing processes and any other application requiring piping and fitting connections wherein a reduced number of pieces may be advantageous.

While illustrative and presently preferred embodiments of the invention have been described in detail hereinabove, it is to be understood that the inventive concepts may be otherwise variously embodied and employed and that the appended claims are intended to be construed to include such variations except insofar as limited by the prior art.

The invention claimed is:

1. A terminal end cap for an upstream wastewater treatment conduit comprising:

an open portion shaped to mate with the upstream wastewater treatment conduit;

an enclosure in fluid communication with the open portion, the enclosure comprising:

a vertical piezometer aperture located on top of the enclosure and connectable to a vertical conduit for receiving a piezometer, wherein the vertical piezometer aperture is configured to monitor effluent level of wastewater present in the wastewater treatment conduit; and a first ventilation aperture and a second ventilation aperture configured to aerobically connect the enclosure to an air vent conduit and to provide passive aeration.

2. The end cap of claim 1, wherein the open portion is a skirt portion configured to mate with the wastewater treatment conduit.

3. The end cap of claim 1, the enclosure further comprising an inner conduit within an inner portion of the enclosure, the inner conduit comprising:

a first open end received by the first ventilation aperture;

a second open end received by the second ventilation aperture; and a third open end received by the vertical piezometer aperture;

the inner conduit being in fluid communication with the open portion.

4. The end cap of claim 3, the inner conduit further comprising a bottom opening in fluid communication with the open portion.

5. The end cap of claim 3, each of the ends of the inner conduit being inserted in each of the side apertures of the enclosure.

6. The end cap of claim 3, the inner conduit being T-shaped.

7. The end cap of claim 3, wherein the enclosure and the inner conduit are unitary.

8. The end cap of claim 3, the enclosure is made of semi-rigid material and the inner conduit being made of rigid material.

9. The end cap of claim 3, each of the open ends of the inner conduit is pressed fit in each of the apertures of the enclosure.

10. The end cap of claim 3, the inner conduit comprising a bottom passage to create the fluid communication with the open portion.

11. The end cap of claim 1, the first ventilation aperture and the second ventilation aperture being on side wall of the enclosure.

12. The end cap of claim 1, the air vent conduit, when connected to the first ventilation and the second ventilation aperture, being connected to the first ventilation and the second ventilation aperture of other end caps.

13. The end cap of claim 1, wherein the first ventilation aperture and the second ventilation aperture are aerobically connected to at least another end cap allowing passive aeration between multiple conduits.

14. A terminal end cap for a wastewater treatment conduit comprising:

an open portion shaped to mate with the upstream wastewater treatment conduit;

an enclosure in fluid communication with the open portion, the enclosure comprising two side walls and a top portion, a first of the side walls comprising a first ventilation aperture, a second of the side walls comprising a second ventilation aperture and the top portion comprising a vertical piezometer aperture;

an inner conduit comprising three open ends, each of the three open ends fitting in each of the three apertures, the inner conduit being in fluid communication with the enclosure, the first and second open ends being inserted in the first and second d ventilation apertures and being connectable to a vent conduit allowing passive aeration, the third open end being inserted in the vertical piezometer aperture and being connectable to a piezometer;

wherein the terminal end cap monitors effluent level of wastewater using a piezometer connection and provides passive aeration via the ventilation apertures.

15. The end cap of claim 14, the inner conduit being T-shaped.

16. The end cap of claim 14, the inner conduit further comprising an opening in fluid communication with the enclosure.

17. The end cap of claim 14, the open portion being a skirt portion configured to mate with the wastewater treatment conduit.

18. The end cap of claim 14, wherein the first ventilation aperture and the second ventilation aperture are aerobically connected to at least another end cap allowing passive aeration between multiple conduits.

* * * * *